Feb. 20, 1962 R. S. FLEMING ET AL 3,021,820
FORCE BALANCE SYSTEM
Original Filed Feb. 18, 1959
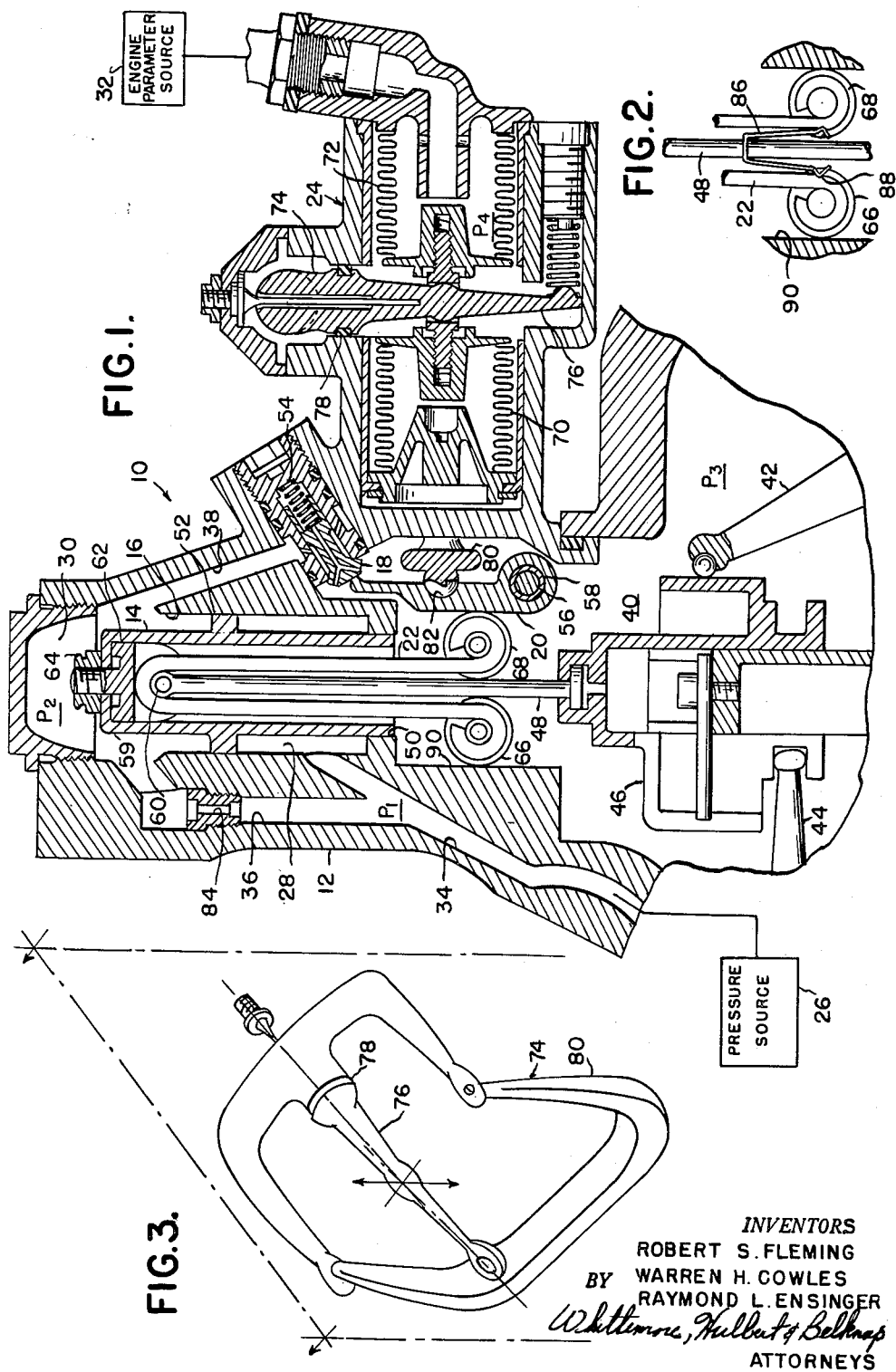
INVENTORS
ROBERT S. FLEMING
BY WARREN H. COWLES
RAYMOND L. ENSINGER
*Whittemore, Hulbert & Belknap*
ATTORNEYS United States Patent Office 3,021,820
Patented Feb. 20, 1962

3,021,820
FORCE BALANCE SYSTEM
Robert S. Fleming, Warren H. Cowles, and Raymond L. Ensinger, Detroit, Mich., assignors to Holley Carburetor Company, Warren, Mich., a corporation of Michigan
Original application Feb. 18, 1959, Ser. No. 794,016. Divided and this application Aug. 22, 1960, Ser. No. 51,108
12 Claims. (Cl. 121—41)

The invention relates to force balance systems and refers more specifically to simplified apparatus for producing an output displacement proportional to an input force thereto which input force is a function of a variable external parameter.

This application is a division of our copending application, Serial No. 794,016, filed February 18, 1959.

It is well known that parameters of speed, temperature and pressure are used independently and/or collectively for controlling and determining the operation of gas turbine power plants, and various hydraulic mechanisms have been designed to sense the magnitudes of these parameters and react in an appropriate manner to correct the fuel flow accordingly. However, these mechanisms have not proved to be entirely satisfactory because of inaccuracies at small force inputs due to the shift in servo operating points, inaccuracies arising from changes in fuel temperatures, complicated "feed-back" cam arrangements, errors due to unbalanced servo hydraulic forces and, lastly, the necessity of maintaining a constant operating pressure differential.

It is now proposed to provide a force balance system which will produce an output displacement as a function of a force input.

The general object of the invention is to greatly minimize, if not completely eliminate the various undesirable conditions previously mentioned.

More specifically it is an object to provide a force balance system comprising pressure responsive means, a lever operable to control the pressure applied to the pressure responsive means, means secured to the pressure responsive means for movement therewith operable to apply a constant force to the lever at different positions therealong tending to move the lever in one direction, and means for applying a force input to the lever at a fixed location in accordance with the variation of an external parameter, whereby movement of the pressure responsive means is proportional to the change of said external parameter.

Still more specifically it is an object of the present invention to provide a force balance system comprising a piston having at least two effective areas and movable within a cylinder, means for applying fluid under pressure to one of the effective areas of the piston, valve means for reducing the pressure applied to the other effective area of the piston to cause movement of the piston within the cylinder, a lever for controlling the position of the valve, means for applying a substantially constant force to said lever at different points therealong depending on the position of the piston, and means for applying a force to the lever at a fixed point to cause movement of the lever in a direction to open the valve, which force varies in accordance with an external parameter.

Another object is to provide a force balance system as set forth above wherein the means for applying a constant force to the lever comprises a U-shaped spring secured to said piston.

Another object is to provide a force balance system as set forth above wherein means are provided to compensate for the effect of temperature on the spring to insure that the spring produces a constant force on the lever over the operating temperature range of the force balance system.

Another object is to provide a force balance system which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a section view of the force balance system of the invention illustrated in the environment of a fuel control system for a gas turbine power plant.

FIGURE 2 is an illustration of a modification of the force balance system shown in FIGURE 1 wherein temperature compensating means are provided.

FIGURE 3 is an illustration of a portion of the parameter sensing and input force applying mechanism of the fuel control with which the force balance system of the invention is illustrated.

With reference to the figures, a particular embodiment of the present invention will now be disclosed.

The force balance system 10, as best shown in FIGURE 1, comprises a housing 12 which may be a part of a fuel control system for a gas turbine engine (not shown), a piston 14 movable within a cylinder 16 formed within the housing 12, a valve 18 for regulating the pressures applied to the piston 14, and lever 20 operable to more fully open or close valve 18. The force balance system 10 further includes spring means 22 for applying a constant force to lever 20 at various points therealong depending upon the position of the piston 14 to which the spring 22 is attached, and sensing means 24 operable to sense an engine parameter and to apply a force variable in accordance with the variation of the engine parameter to the lever 20 at a fixed point therealong.

In operation a constant pressure $P_1$ from an external source 26 is maintained in chamber 28 while the pressure $P_2$ in chamber 30 is caused to be lowered due to increased opening of valve 18 on an increase of the engine parameter from source 32 as sensed by the sensing means 24 and applied to lever 20. The piston is therefore caused to move upwardly in FIGURE 1, thus varying the position of the constant force applied to the lever 20 by spring 22 until the lever is returned to the position shown wherein the valve 18 positioned so that pressures $P_1$, $P_2$ and $P_3$ acting on piston 14 hold the piston in equilibrium.

More specifically the housing 12 which, as indicated above, may be part of a larger fuel control mechanism for a gas turbine engine and includes passages 34, 36 and 38 therein in addition to the cylinder 16 in which the piston 14 reciprocates. Also, the housing 12 is provided with a space therein for the sensing mechanism 24 and includes a cavity or sump 40 in which a sink pressure $P_3$ is maintained and in which fuel control levers 42 and 44 are mounted for positioning by cam means 46 on axial displacement of piston rod 48.

Piston 14, as shown best in FIGURE 1, extends through opening 50 in housing 12. The piston 14 is formed as shown in FIGURE 1 and is provided with a centrally located annular flange 52 therearound which operates to guide the piston 14 for movement within the cylinder 16 and further divides the cylinder 16 into a chamber 28 and a chamber 30 whereby piston 14 is a differential area motion piston.

Valve 18 is secured within housing 12 by convenient means, such as threads, as shown, and when opened permits passage of fluid between chamber 30 and sump 40 through passage 38. Valve 18 is urged toward the open position by means of spring 54.

Lever 20 is pivotally mounted in housing 12 by means of pivot pin 56 and bearing sleeve 58. Lever 20 is operable to close valve 18 when rotated in a clockwise direction from the position shown in FIGURE 1 and is rotatable counterclockwise with respect to its position in FIGURE 1 to permit opening of valve 18 under influence of spring 54. Lever 20 is positioned by the spring 22 carried by piston 14 and by the parameter sensing means 24 through forces applied thereto tending to cause pivoting of the lever 20 about pivot pin 56.

Spring 22 which is generally U-shaped as shown is secured to the end 59 of piston 14 by means of pin 60 passing through bracket 62 which is held in position within the piston 14 by means of bolt 64. Rollers 66 and 68 are carried by the opposite ends of spring 22 to permit ready movement of piston 14 and therefore the point of application of the force applied to the lever 20 by the spring 22 on variation of the pressure in chambers 28 and 30.

The parameter sensing means 24 comprises opposed bellows 70 and 72 which have movable adjacent ends and fixed remote ends and a pivotally mounted lever apparatus 74 held between the bellows 70 and 72. Thus on change of input parameter, such as compressor inlet pressures $P_4$, the arm 76 of the lever apparatus 74 is caused to pivot about pivot mounting 78 therefor, whereby the force transmitting arm 80 of lever apparatus 74 is caused to transmit the change in pressure $P_4$ to the lever 20 at point 82 thereon.

Thus in operation it will be assumed that the pressure $P_4$ has been constant for a period sufficient to enable the force balance system 10 to reach equilibrium with the elements thereof positioned as shown in FIGURE 1. It is then assumed that the pressure $P_4$ is caused to raise due to a condition external to the force balance system for which it is desired to adjust the fuel supply of the gas turbine engine with which the force balance system is associated by means of axial adjustment of the piston rod 48.

On increase of pressure $P_4$ as sensed by the sensing apparatus 24 the force applied by means of arm 80 of lever apparatus 74 to lever 20 at point 82 will also be increased. The increase of force on lever 20 at point 82 will cause lever 20 to rotate counterclockwise whereby valve 18 is more fully opened.

More fully opening valve 18 permits increased flow of fluid from chamber 30 into sump 20 through passage 38, whereby the pressure $P_2$ in chamber 30 is reduced to a value below pressure $P_1$ so that the pressure $P_1$ within chamber 28 causes movement of piston 14 in an upward direction as shown in FIGURE 1.

Movement of piston 14 in an upward direction changes the location of the application of the constant force applied to lever 20 by means of spring 22 through roller 68 since spring 22 is mounted for movement with piston 14. The piston 14 will be allowed to move to a position such that the force applied to lever 20 through roller 68 will counteract the force applied to lever 20 at point 82 through arm 80 to return the lever 20 to the original position thereof.

The valve 18 will then be positioned so that the flow through restriction 84 in passage 36 is such that pressure $P_2$ on piston 14 is such that it is balanced by the pressures $P_1$, $P_2$ and $P_3$ acting thereon. The piston 14 will then again be in equilibrium in a position determined by pressure $P_4$. Thus it can be seen that due to a rise in pressure $P_4$ a proportional movement of the piston rod 48 has been accomplished through means of the force balance system 10 whereby the cam 46 is positioned to provide proper fuel control action through levers 42 and 44 as required by the change in pressure $P_4$.

Mathematically it can be seen that if the force applied at point 82 on lever 20 is indicated by the symbol $F_n$ and the distance from the pivot pin 58 to the point of application of force $F_n$ is indicated $L_n$ and the force applied to the lever 20 by means of spring 22 is $F_s$ and the distance from the pivot pin 58 at which it is applied to the lever 20 is $L_s$, the forces acting on the lever 20 when the lever is in equilibrium may be represented by the equation:

$$(F_s) \times (L_s) = (F_n) \times (L_n)$$

Further since the spring force exerted on lever 20 is a constant $F_s$ is equal to some constant $K_1$. Also, since the distance from the pivot point 58 to the point of application of the force $F_n$ is always the same the distance $L_n$ is some constant $K_2$. Therefore by substituting $K_1$ and $K_2$ in the above equation dividing both sides of the equation by $K_1$ and substituting some constant $K_3$ for $K_2$ divided by $K_1$, we have a new equation: then $$L_s = F_n(K_3)$$

From this it is evident that movement of the piston 14 will be linear with respect to the force applied to the lever 20 at point 82.

FIGURE 2 indicates means for compensating for the effect of temperature on the spring 22. To provide a linear relationship between the force applied to the lever 20 at point 82 and the displacement of the piston rod 48, it is necessary that the force applied to the lever 20 by means of spring 22 be constant. Springs, such as 22, however have properties which vary in accordance with the temperature thereof. Therefore, as shown in FIGURE 2, a compensating spring 86 is sleeved over the piston rod 48 as shown and is secured to the spring 22 within notches 88 therein. Thus with the temperature characteristics of the spring 86 properly chosen, the change in characteristics of the spring 22 due to temperature can be compensated for to provide a constant pressure on both the surface 90 of housing 12 and on the lever 20.

The drawings and the foregoing specification constitute a description of the improved force balance system in such full, clear, concise and exact terms as to enable any person skilled in the art to practice the invention, the scope of which is indicated by the appended claims.

What we claim as our invention is:

1. A force balance system for producing an output movement which varies according to the variations of an input parameter, comprising a pivotally mounted lever having a control surface, pressure responsive means, a U-shaped leaf spring pivoted to said pressure responsive means at the mid point of said spring whereby said spring is movable with respect to said lever on movement of said pressure responsive means, rollers secured to both ends of said leaf spring, a fixed surface engaging one of said rollers during movement thereof, the other of said rollers engaging said control surface of said lever during movement of said spring to exert a constant force on said lever at different points longitudinally thereof valve means located adjacent and positioned by said lever for regulating the pressure applied to the pressure responsive means and therefore the movement thereof in accordance with the position of said lever, and means responsive to the variations of the input parameter engaged with said lever for urging said lever in the opposite direction.

2. A force balance system for producing an output movement which varies according to the variations of an input parameter, comprising a pivotally mounted lever having a control surface, pressure responsive means, leaf spring means secured to said pressure responsive means engageable with said control surface of said lever and movable therealong in response to movement of the pressure responsive means operable to exert a constant force on said lever tending to rotate said lever in one direction, valve means located adjacent and positioned by said lever for regulating the pressure applied to the pressure responsive means and therefore the movement thereof in accordance with the position of said lever, means responsive to the variations of the input parameter engaged with said lever for urging said lever in the opposite direction, and means for compensating for the effect of temperature on said spring to insure the force exerted thereby on said lever is constant.

3. A force balance system for producing an output movement which varies according to the variations of an input parameter, comprising a pivotally mounted lever having a control surface, pressure responsive means, leaf spring means secured to said pressure responsive means engageable with said control surface of said lever and movable therealong in response to movement of the pressure responsive means operable to exert a constant force on said lever tending to rotate said lever in one direction, valve means located adjacent and positioned by said lever for regulating the pressure applied to the pressure responsive means and therefore the movement thereof in accordance with the position of said lever, means responsive to the variations of the input parameter engaged with said lever for urging said lever in the opposite direction, and auxiliary spring means also secured to said pressure responsive means and operable between said pressure responsive means and leaf spring to compensate for the effect of temperature on said leaf spring to insure the force exerted thereby on said lever is constant.

4. A force balance system for producing an output movement which varies according to the variations of an input parameter, comprising a pivotally mounted lever having a control surface, a two diameter piston responsive to changes in pressure, a U-shaped leaf spring pivoted to said piston at the mid point of said spring whereby said spring is movable with respect to said lever on movement of said piston, rollers secured to both ends of said leaf spring, a fixed surface engaging one of said rollers during movement thereof, the other of said rollers engaging said control surface of said lever during movement of said spring to exert a constant force on said lever at different points longitudinally thereof, valve means located adjacent and positioned by said lever for regulating the pressure applied to the piston and therefore the movement thereof in accordance with the position of said lever, and means engaged with said lever responsive to the variations of the input parameter for urging said lever in the opposite direction.

5. A force balance system for producing an output movement which varies according to the variations of an input parameter, comprising a pivotally mounted lever having a control surface, a two diameter piston responsive to changes in pressure, a U-shaped leaf spring pivoted to said piston at the mid point of said spring whereby said spring is movable with respect to said lever on movement of said piston, rollers secured to both ends of said leaf spring, a fixed surface engaging one of said rollers during movement thereof, the other of said rollers engaging said control surface of said lever during movement of said spring to exert a constant force on said lever at different points longitudinally thereof, valve means located adjacent and positioned by said lever for regulating the pressure applied to the piston and therefore the movement thereof in accordance with the position of said lever, means engaged with said lever responsive to the variations of the input parameter for urging said lever in the opposite direction, and auxiliary spring means also secured to said pressure responsive means and operable between said pressure responsive means and leaf spring to compensate for the effect of temperature on said leaf spring to insure the force exerted thereby on said lever is constant.

6. A closed loop moment balance system for sensing an engine operating parameter, said system comprising a multi-diameter piston adapted to be influenced by at least two distinct fluid pressures, a pivotally supported moment arm, leaf-type spring means adapted to create a force connected to said piston in a manner so as to be capable of applying said created force at various points along said moment arm, thermostatic means cooperating with said leaf-type spring means adapted to compensate for variations in said created force due to temperature changes, valve means secured to the free end of said moment arm for varying the magnitude of one of said distinct fluid pressures, and means for directing a force input to said moment arm for actuating said valve means.

7. A mechanical computing device for creating an output movement proportional to the magnitude of a force input, said device comprising a piston responsive to changes in pressure, a leaf spring secured to said piston, a plurality of rollers cooperating with and being normally urged away from each other by said leaf spring secured to said piston, a restraining member positively limiting the outward movement of one of said rollers, a pivotally mounted second restraining member yieldingly limiting the outward movement of the other of said rollers, a servo valve connected to said second restraining member for varying the magnitude of one of the various pressures influencing said piston, and means for directing said force input to said second restraining member at a distance away from the pivoted mounting thereof.

8. A closed loop moment balance system for sensing an engine operating parameter, said system comprising a multi-diameter piston adapted to be influenced by at least two distinct fluid pressures, a pivotally supported moment arm, leaf-type spring means adapted to create a force connected to said piston in a manner so as to be capable of applying said created force at various points along said moment arm, auxiliary spring means also connected to said piston and operable between the piston and leaf spring to compensate for the effect of temperature on the leaf spring to insure the force exerted by the leaf spring on the moment arm is constant, valve means secured to the free end of said moment arm for varying the magnitude of one of said distinct fluid pressures, and means for directing a force input to said moment arm for actuating said valve means.

9. A mechanical computing device for creating an output movement proportional to the magnitude of a force input, said device comprising a piston responsive to changes in pressure, a leaf spring secured to said piston, a plurality of rollers cooperating with and being normally urged away from each other by said leaf spring secured to said piston, a restraining member positively limiting the outward movement of one of said rollers, a pivotally mounted second restraining member yieldingly limiting the outward movement of the other of said rollers, a servo valve connected to said second restraining member for varying the magnitude of one of the various pressures influencing said piston, means for directing said force input to said second restraining member at a distance away from the pivoted mounting thereof, and means for compensating for the effect of temperature on said spring to insure the force exerted thereby on said second restraining member is constant.

10. A force balance system for producing an output movement which varies according to the variations of an input parameter, comprising a pivotally mounted lever having a control surface, pressure responsive means, a U-shaped leaf spring pivoted to said pressure responsive means at the mid point of said spring whereby said spring is movable with respect to said lever on movement of said pressure responsive means, rollers secured to both ends of said leaf spring, a fixed surface engaging one of said rollers during movement thereof, the other of said rollers engaging said control surface of said lever during movement of said spring to exert a constant force on said lever at different points longitudinally thereof, valve means located adjacent and positioned by said lever for regulating the pressure applied to the pressure responsive means and therefore the movement thereof in accordance with the position of said lever, means responsive to the variations of the input parameter engaged with said lever for urging said lever in the opposite direction, and means for compensating for the effect of temperature on said spring to insure the force exerted thereby on said lever is constant.

11. A force balance system for producing an output movement which varies according to the variations of an input parameter, comprising a pivotally mounted lever having a control surface, pressure responsive means, a U-shaped leaf spring pivoted to said pressure responsive means at the mid point of said spring whereby said spring is movable with respect to said lever on movement of said pressure responsive means, rollers secured to both ends of said leaf spring, a fixed surface engaging one of said rollers during movement thereof, the other of said rollers engaging said control surface of said lever during movement of said spring to exert a constant force on said lever at different points longitudinally thereof, valve means located adjacent and positioned by said lever for regulating the pressure applied to the pressure responsive means and therefore the movement thereof in accordance with the position of said lever, means responsive to the variations of the input parameter engaged with said lever for urging said lever in the opposite direction, and auxiliary spring means also secured to said pressure responsive means and operable between said pressure responsive means and leaf spring to compensate for the effect of temperature on said leaf spring to insure the force exerted thereby on said lever is constant.

12. A force balance system for producing an output movement which varies according to the variations of an input parameter, comprising a pivotally mounted lever having a control surface, a two diameter piston responsive to changes in pressure, a U-shaped leaf spring pivoted to said piston at the mid point of said spring whereby said spring is movable with respect to said lever on movement of said piston, rollers secured to both ends of said leaf spring, a fixed surface engaging one of said rollers during movement thereof, the other of said rollers engaging said control surface of said lever during movement of said spring to exert a constant force on said lever at different points longitudinally thereof, valve means located adjacent and positioned by said lever for regulating the pressure applied to the piston and therefore the movement thereof in accordance with the position of said lever, means engaged with said lever responsive to the variations of the input parameter for urging said lever in the opposite direction, and means for compensating for the effect of temperature on said spring to insure the force exerted thereby on said lever is constant.

References Cited in the file of this patent

UNITED STATES PATENTS

| 1,798,932 | Dreiske | Mar. 31, 1931 |
| 2,220,180 | Spitzglass et al. | Nov. 5, 1940 |
| 2,600,777 | Johnson | June 17, 1952 |
| 2,764,868 | Watson et al. | Oct. 2, 1956 |

FOREIGN PATENTS

| 734,621 | Great Britain | Aug. 3, 1955 |